US012806984B2

(12) United States Patent
Kurosaki

(10) Patent No.: US 12,806,984 B2
(45) Date of Patent: Nov. 24, 2026

(54) TRANSAXLE

(71) Applicant: TOYOTA JIDOSHA KABUSHIKI KAISHA, Toyota (JP)

(72) Inventor: Yuki Kurosaki, Yamato (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 19/032,722

(22) Filed: Jan. 21, 2025

(65) Prior Publication Data

US 2025/0296416 A1 Sep. 25, 2025

(30) Foreign Application Priority Data

Mar. 21, 2024 (JP) ................................ 2024-045549

(51) Int. Cl.

| | |
|---|---|
| ***B60K 1/00*** | (2006.01) |
| ***B60K 17/16*** | (2006.01) |
| ***F16H 37/04*** | (2006.01) |
| ***F16H 57/037*** | (2012.01) |
| ***F16H 57/08*** | (2006.01) |
| *F16H 57/02* | (2012.01) |

(52) U.S. Cl.

CPC ................ *B60K 1/00* (2013.01); *B60K 17/16* (2013.01); *F16H 37/041* (2013.01); *F16H 57/037* (2013.01); *F16H 57/082* (2013.01); *B60K 2001/001* (2013.01); *F16H 2057/02034* (2013.01)

(58) Field of Classification Search

CPC .... B60K 1/00; B60K 2001/001; B60K 17/16; F16H 37/041; F16H 57/037; F16H 57/082; F16H 2057/02034

See application file for complete search history.

(56) References Cited

U.S. PATENT DOCUMENTS 6,220,984 B1 * 4/2001 Schulz ...................... F16H 1/46 475/342
9,810,312 B2 * 11/2017 Obayashi ............ F16H 57/0479
2016/0208905 A1 7/2016 Obayashi et al.
2021/0213819 A1 7/2021 Hibino et al.
2021/0276409 A1 * 9/2021 Devreese ............... B60K 17/06
2024/0401683 A1 * 12/2024 Matsuda .................. B60K 1/00

FOREIGN PATENT DOCUMENTS

JP 2001-525044 A 12/2001
JP 2015-68492 A 4/2015
JP 2021-110374 A 8/2021

* cited by examiner

*Primary Examiner* — Timothy Hannon

(74) *Attorney, Agent, or Firm* — Sughrue Mion, PLLC

(57) ABSTRACT

A transaxle includes: a planetary gear mechanism having a stepped pinion gear in which a large-diameter pinion gear and a small-diameter pinion gear are integrated; a differential device disposed radially inward of the small-diameter pinion gear; and a transaxle case for accommodating the planetary gear mechanism and the differential device. Further, the planetary gear mechanism includes a sun gear, provided on an output shaft of the electric motor, which meshes with the large-diameter pinion gear, a ring gear which rotates at a same rotational speed as a differential case of the differential device rotates, a carrier, fixed to the transaxle case, which rotatably supports the stepped pinion gear, and an outer pinion gear which is rotatably supported by the carrier and meshes with the small diameter pinion gear and the ring gear.

2 Claims, 6 Drawing Sheets

TRANSAXLE

CROSS-REFERENCE TO RELATED APPLICATION(S)

The present application claims priority to and incorporates by reference the entire contents of Japanese Patent Application No. 2024-045549 filed in Japan on Mar. 21, 2024.

BACKGROUND

The present disclosure relates to a transaxle.

Japanese Laid-open Patent Publication No. 2021-110374 discloses a transaxle for transmitting power output from the motor to the axle via the planetary gear mechanism and the differential.

SUMMARY

There is a need for providing a transaxle capable of ensuring a large driving force while suppressing the size increase of the body size, and also capable of taking a large reduction ratio.

According to an embodiment, a transaxle includes: a planetary gear mechanism having a stepped pinion gear in which a large-diameter pinion gear and a small-diameter pinion gear are integrated; a differential device disposed radially inward of the small-diameter pinion gear; and a transaxle case for accommodating the planetary gear mechanism and the differential device. Further, the transaxle transmits a power of an electric motor to a vehicle axle through the planetary gear mechanism and the differential device, the planetary gear mechanism includes a sun gear, provided on an output shaft of the electric motor, which meshes with the large-diameter pinion gear, a ring gear which rotates at a same rotational speed as a differential case of the differential device rotates, a carrier, fixed to the transaxle case, which rotatably supports the stepped pinion gear, and an outer pinion gear which is rotatably supported by the carrier and meshes with the small diameter pinion gear and the ring gear.

DETAILED DESCRIPTION

In a transaxle that transmits a power of a motor, a larger reduction ratio may be desired to ensure a greater driving force or to make the motor smaller. In this case, in the structure in which the stepped pinion gear of the planetary gear mechanism revolves as in the configuration described in Japanese Laid-open Patent Publication No. 2021-110374, the outermost diameter of the revolving track of the large-diameter pinion gear is increased, there is a possibility that the radial body size of the transaxle is increased.

Hereinafter, a transaxle in an embodiment of the present disclosure will be specifically described. Note that the present disclosure is not limited to the embodiments described below.

Figure 1:
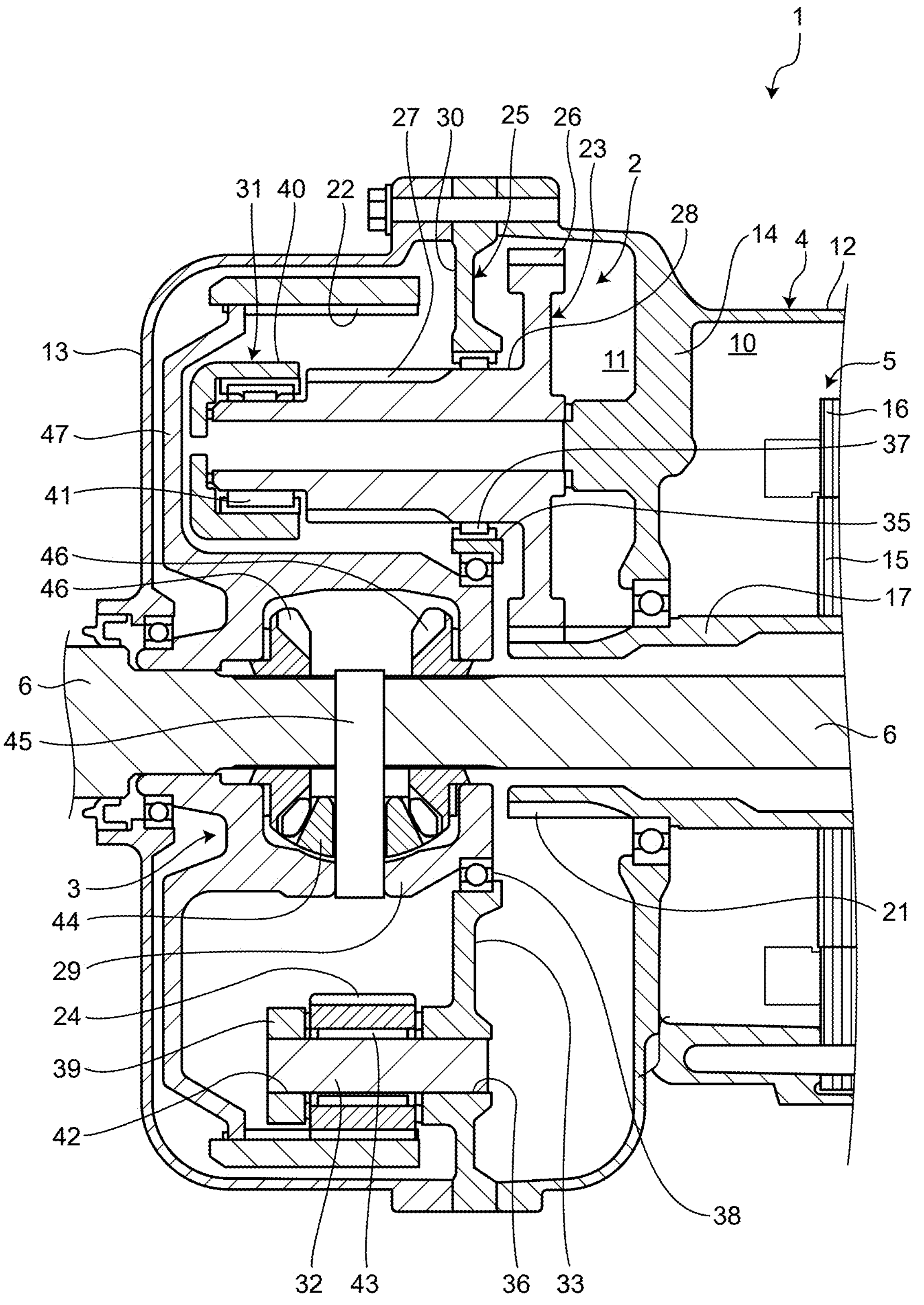
FIG. 1 is a cross-sectional view illustrating a transaxle according to an embodiment.

FIG. 1 is a cross-sectional view illustrating a transaxle according to an embodiment. A transaxle 1 is a power transmission device mounted on a vehicle. The transaxle 1 includes a planetary gear mechanism 2, a differential device 3, and a transaxle case 4.

The transaxle 1 transmits a power output from a motor 5, which is the power source of the vehicle, to an axle 6 through the planetary gear mechanism 2 and the differential device 3. The motor 5 and the axle 6 are arranged on the same axis. The motor 5 is connected to the planetary gear mechanism 2 so as to transmit the power. The planetary gear mechanism 2, the differential device 3, and the motor 5 are housed in a transaxle case 4. The right and left axles 6 pass through the transaxle case 4. The transaxle case 4 forms a motor chamber 10 which houses motor 5 and a gear chamber 11 which houses planetary gear mechanism 2 and differential device 3.

The transaxle case 4 includes a case body 12 and a cover member 13. The case body 12 is a cylindrical case member. The cover member 13 is attached to the case body 12 from one side in the axial direction so as to cover the opening of the case body 12. The case body 12 and the cover member 13 are integrated by bolting. The case body 12 has a partition wall 14 for partitioning the motor chamber 10 and the gear chamber 11. The partition wall 14 is a wall portion.

The motor 5 includes a rotor 15, a stator 16, and an output shaft 17. The rotor 15 rotates at the same rotational speed as the output shaft 17. The stator 16 is fixed to the case body 12. The output shaft 17 outputs the power of the motor 5 to the planetary gear mechanism 2. The output shaft 17 extends from the motor chamber 10 to the gear chamber 11. The end portion of the gear chamber 11 side of the output shaft 17, a sun gear 21 of the planetary gear mechanism 2 is formed.

Figure 2:
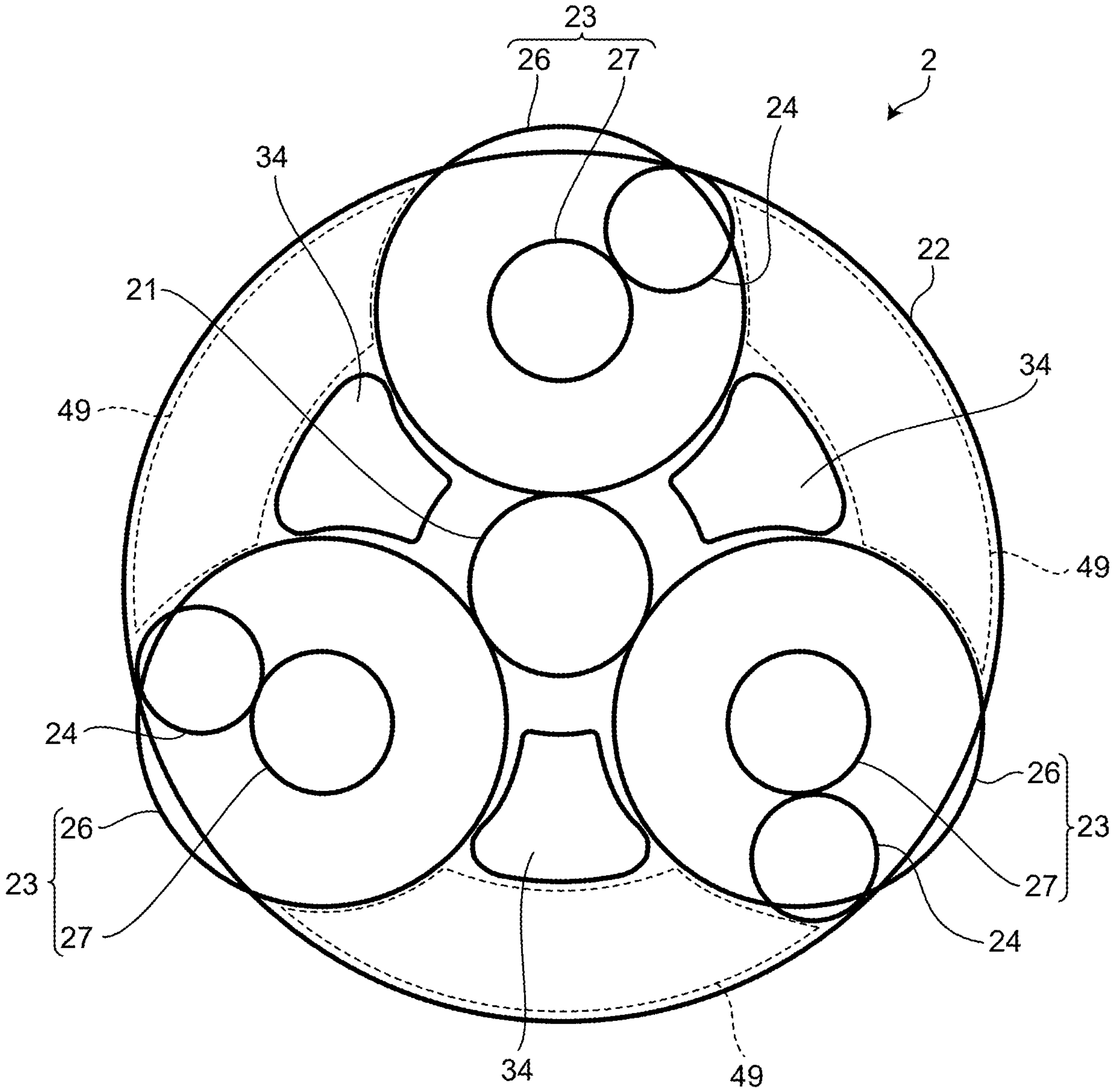
FIG. 2 is a diagram for explaining a structure of a planetary gear mechanism.

The planetary gear mechanism 2 is a planetary gear mechanism of step pinion type and double pinion type. As illustrated in FIGS. 1 and 2, the planetary gear mechanism 2 includes the sun gear 21, a ring gear 22, a stepped pinion gear 23, an outer pinion gear 24, and a carrier 25. The sun gear 21 is an input element. The ring gear 22 is an output element. The carrier 25 is a reaction element. The carrier 25 rotatably holds the stepped pinion gear 23 and rotatably holds the outer pinion gear 24. Three stepped pinion gear 23 and three outer pinion gear 24 are provided on the carrier 25. The three stepped pinion gear 23 are arranged at equal intervals in the circumferential direction of the carrier 25. The three outer pinion gear 24 are arranged at equal intervals in the circumferential direction of the carrier 25.

The stepped pinion gear 23 includes a large diameter pinion gear 26, a small diameter pinion gear 27, and a pinion shaft 28. The large-diameter pinion gear 26, the small-diameter pinion gear 27, and the pinion shaft 28 are integrally formed. The large diameter pinion gear 26 meshes with the sun gear 21. The small-diameter pinion gear 27 is a gear formed to have a smaller diameter than the large-diameter pinion gear 26. The small diameter pinion gear 27 meshes with the outer pinion gear 24. The pinion shaft 28 is arranged parallel to the output shaft 17 and the axle 6. The outer pinion gear 24 meshes with the small diameter pinion gear 27 and the ring gear 22. The ring gear 22 rotates at the same rotational speed as the differential case 29 of the differential device 3. The differential case 29 of the differential device 3 is disposed radially inward of the small-diameter pinion gear 27.

The carrier 25 includes a carrier body 30, a carrier cover 31, and an outer pinion shaft 32. The carrier body 30 has a structure in which the carrier plate 33 and a bridge portion 34 are integrally formed. The carrier plate 33 is a disk-shaped plate member is bolted to the transaxle case 4. Periphery of the carrier plate 33 is bolted in a state of being sandwiched between the case body 12 and the cover member 13. The bridge portion 34 protrudes from the carrier plate 33 on one side in the axial direction. In the carrier plate 33, there are formed a first through hole 35, through which the pinion shaft 28 of the stepped pinion gear 23 is inserted, and a second through hole 36 for holding the outer pinion shaft 32. To the first through hole 35, a needle bearing 37 is fitted. The needle roller bearing 37 is a bearing for supporting a stepped pinion gear 23. The needle bearing 37 is mounted to a portion of the pinion shaft 28 between the large diameter pinion gear 26 and the small diameter pinion gear 27. The needle bearing 37 is a bearing that supports pinion shaft 28. The large diameter pinion gear 26 is disposed on the partition wall 14 side than the carrier plate 33.

The bearing 38 is provided on the inner peripheral portion of the carrier plate 33. The bearing 38 supports the differential case 29. The carrier body 30 rotatably supports the differential case 29 via a bearing 38 provided on the inner peripheral portion of the carrier plate 33. The bridge portion 34 connects the carrier plate 33 and the carrier cover 31. To a distal end portion of the bridge portion 34, the carrier cover 31 is attached. Thus, the carrier body 30 and the carrier cover 31 are integrated.

The carrier cover 31 is a disk-shaped member disposed to face the carrier plate 33 in the axial direction. The carrier cover 31 has a disk-shaped plate portion 39 and the bottomed cylindrical boss portion 40 is integrally formed structure. The boss portion 40 protrudes from the plate portion 39 on one side in the axial direction. The boss portion 40 supports one end of the pinion shaft 28. A needle bearing 41 is mounted on one end of the pinion shaft 28. The needle bearing 41 is provided on the inner peripheral portion of the boss portion 40, for supporting the pinion shaft 28.

In the plate portion 39, a third through hole 42 for holding the outer pinion shaft 32 is provided. The outer pinion shaft 32 is a fixed shaft arranged parallel to the pinion shaft 28. The outer pinion shaft 32 has one end portion held in the third through hole 42 of the carrier cover 31, and the other end portion is held in the second through hole 36 of the carrier body 30. A needle bearing 43 is mounted on the outer pinion shaft 32. The needle bearing 43 is provided on the inner periphery of the outer pinion gear 24 and supports the outer pinion gear 24. The outer pinion shaft 32 rotatably supports the outer pinion gear 24 through the needle bearing 43.

The differential device 3 includes a differential case 29, a differential pinion gear 44, a differential pinion shaft 45, and a differential side gear 46. The differential case 29 has a flange portion 47. The flange portion 47 is connected to the ring gear 22. The differential case 29 is rotatably supported to the transaxle case 4 through a bearing 48. The differential pinion gear 44 and the differential pinion shaft 45 and the differential side gear 46 is accommodated inside the differential case 29. The differential pinion gear 44 engages the differential side gear 46. The differential side gear 46 is fixed to the axle 6. The differential pinion shaft 45 is fixed to the differential case 29. A pair of differential pinion gear 44 is rotatably supported to the differential pinion shaft 45. When the ring gear 22 is rotated, the ring gear 22 and the differential case 29 is rotated together with the differential pinion shaft 45, the left and right axles 6 are rotated by the differential side gear 46 of the left and right are driven by the differential pinion gear 44.

Figure 3:
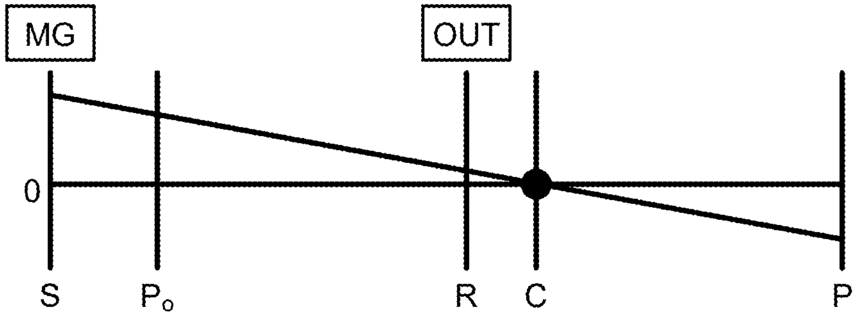
FIG. 3 is a collinear diagram illustrating a state of each element of the planetary gear mechanism in a driving state.

As illustrated in FIG. 3, when the vehicle is in a driving state, the torque output from the motor 5 acts on the sun gear 21, and the sun gear 21 rotates. In this case, since the carrier 25 is fixed, the torque acts on the ring gear 22, and the torque is transmitted to the axle 6. The rotational speed of the ring gear 22 is an output element is smaller than the rotational speed of the sun gear 21 is an input element. The planetary gear mechanism 2 functions as a reduction gear. In FIG. 3, the motor 5 is described as "MG", the differential case 29 as "OUT", the sun gear 21 as "S", the ring gear 22 as "R", the carrier 25 as "C", the stepped pinion gear 23 as "P", and the outer pinion gear 24 as "PO".

Figure 4:
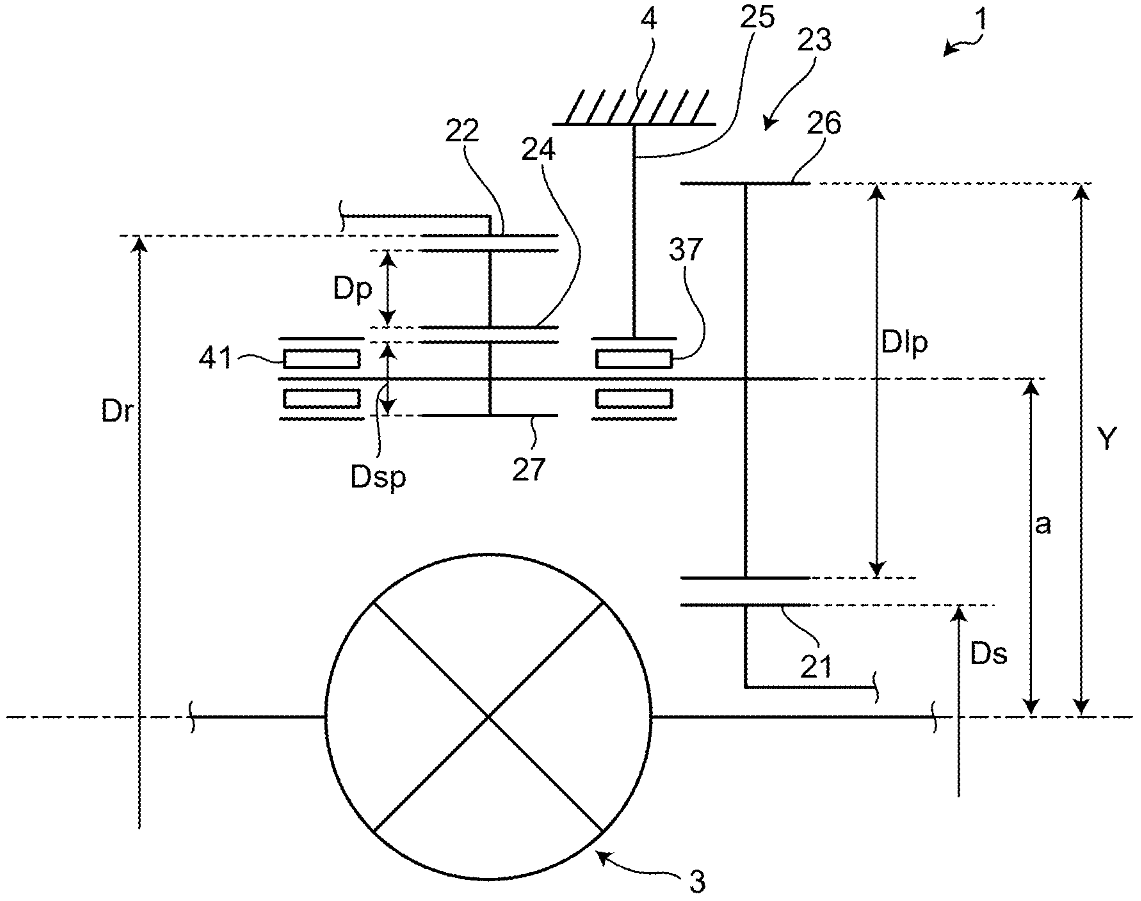
FIG. 4 is a diagram schematically illustrating the transaxle.
Figure 5:
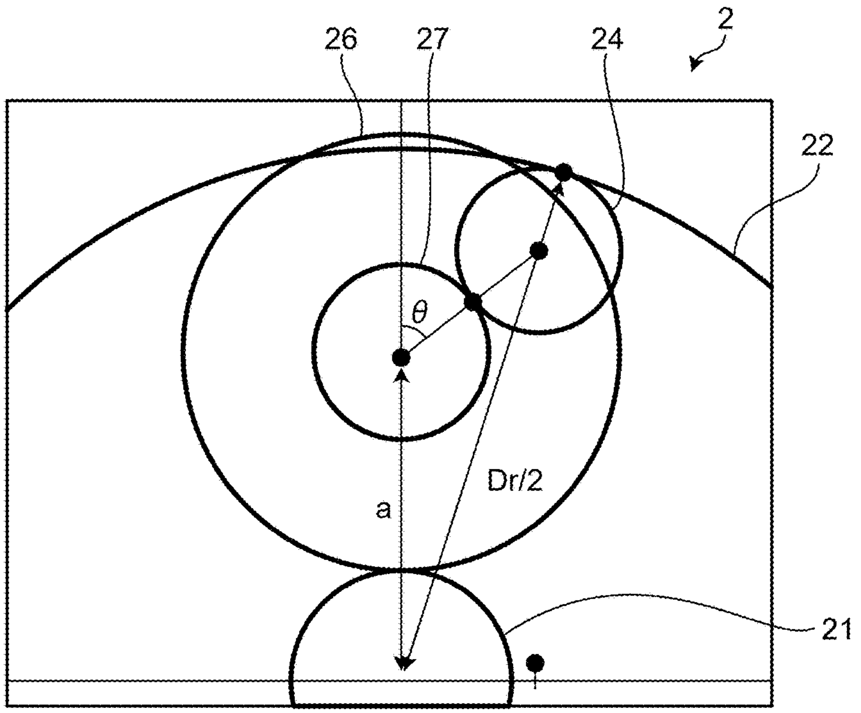
FIG. 5 is a diagram for explaining a detailed structure of the planetary gear mechanism.

As illustrated in FIGS. 2, 4, and 5, for the size and arrangement of the planetary gear mechanism 2, the ring gear 22 is formed in a large diameter extending to a position close to the position of the outermost diameter portion of the large-diameter pinion gear 26. The position of the outermost diameter portion of the large-diameter pinion gear 26 is radially outward from the ring gear 22. As illustrated in FIG. 4, the position of the outermost diameter portion of the large-diameter pinion gear 26 can be expressed by the radial distance Y from the rotation center axis of the sun gear 21 to the outermost diameter portion of the large-diameter pinion gear 26. The distance between the rotation center axis of the sun gear 21 and the rotation center axis of the large-diameter pinion gear 26 is given as a between-shafts distance a. As illustrated in FIG. 5, the outer pinion gear 24, when viewed planetary gear mechanism 2 from the axial direction, is disposed at a circumferential position where the arrangement angle theta (θ) with respect to a straight line passing through the rotation center axis of the sun gear 21 and the rotation center axis of the rotation center axis of the large-diameter pinion gear 26. The arrangement angle θ of the outer pinion gear 24 can be set to an arbitrary value. Incidentally, the rotation center axis line of the rotation center axis and the ring gear 22 of the sun gear 21 are the same. The sun gear 21, the ring gear 22, and the axle 6 rotate on the same rotation center axis. The rotation center axis of the large-diameter pinion gear 26 is synonymous with the rotation center axis of the small-diameter pinion gear 27, and is synonymous with the rotation center axis of the stepped pinion gear 23.

The relational expression for the reduction ratio (gear ratio) X is expressed by the following equation (1). The relational expression for the distance between shafts a is expressed by the following equation (2). In the arrangement illustrated in FIG. 5, the relational expression of the radial Dr of the ring gear 22 using the arrangement angle theta of the outer pinion gear 24 is expressed by the following equation (3).

$$X = Dr/Ds \times Dlp/Dsp \qquad \text{Equation (1)}$$

-continued $$2a = Ds + Dlp \qquad \text{Equation (2)}$$

$$Dr = \{a^2 + (Dsp/2 + Dp/2)^2 + 2a(Dsp/2 + Dp/2)\cos\theta\}^{0.5} + Dp/2 \qquad \text{Equation (3)}$$

For the above equation (1), X is the reduction ratio (gear ratio), Dr is the diameter of the ring gear 22, Ds is the diameter of the sun gear 21, Dlp is the diameter of the large-diameter pinion gear 26, and Dsp is the diameter of the small-diameter pinion gear 27. For the above equation (2), a is the distance between axes. For the above equation (3), Dp is the diameter of the outer pinion gear 24, theta (θ) is the arrangement angle of the outer pinion gear 24.

A relational expression modified using the above equation (2) and the above equation (3) is expressed by the following equation (4).

$$Dr = \{(Ds/2 + Dlp/2)^2 + (Dsp/2 + Dp/2)^2 + 2(Ds/2 + Dlp/2)(Dsp/2 + Dp/2)\cos\theta\}^{0.5} + Dp/2 \qquad \text{Equation (4)}$$

In order to increase the reduction gear ratio X without reducing the strength capacity in the transaxle 1, an increase in the radial Dr of the ring gear 22 or an increase in the radial Dlp of the large-diameter pinion gear 26 is required. From the above equation (4), even without increasing the diameter Dlp of the large-diameter pinion gear 26, by increasing the arrangement angle θ and the diameter Dp of the outer pinion gear 24, it is possible to increase the radial Dr of the ring gear 22. Therefore, it is possible to suppress an increased diameter Dlp of the large-diameter pinion gear 26 required for securing a larger reduction ratio X. Thus, as illustrated in FIGS. 6 and 10, the radial body size of the transaxle 1 can be smaller than that of the related-art structure.

Figure 9:
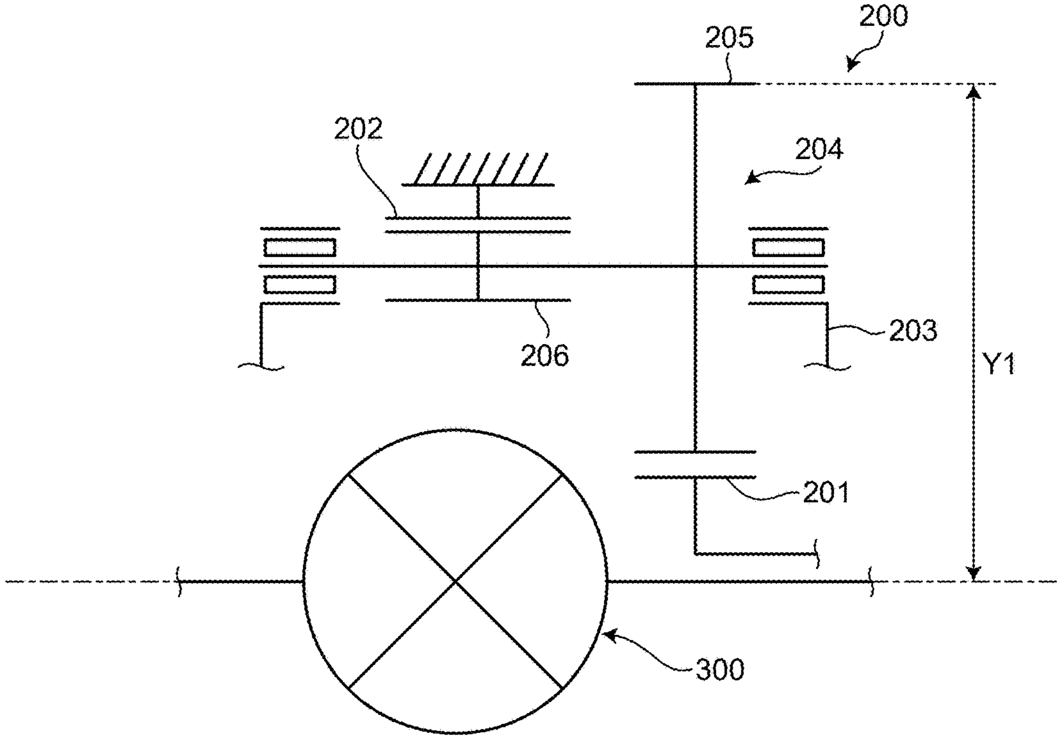
FIG. 9 is a diagram schematically illustrating a transaxle having a related-art structure.
Figure 10:
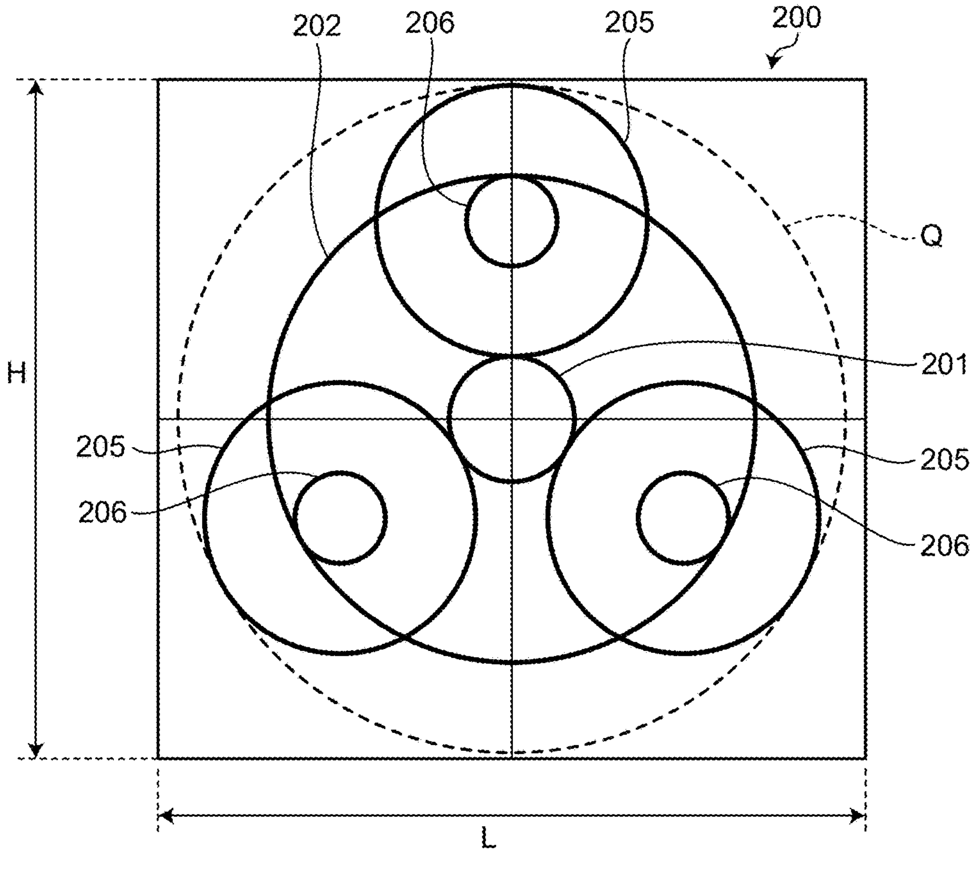
FIG. 10 is a diagram for explaining a body structure of the planetary gear mechanism of the related-art structure when the gear ratio is 12.5.

As illustrated in FIGS. 9 and 10, the transaxle of the related-art structure includes a planetary gear mechanism 200 and a differential device 300. The planetary gear mechanism 200 includes a sun gear 201, a ring gear 202, a carrier 203, and a stepped pinion gear 204. The ring gear 202 is fixed to the transaxle case. The carrier 203 holds the stepped pinion gear 204 so as to be able to rotate and revolve. The stepped pinion gear 204 includes a large diameter pinion gear 205 which mates with the sun gear 201 and a small diameter pinion gear 206 which mates with the ring gear 202. The differential device 300 is disposed radially inwardly of the small diameter pinion gear 206. The revolving track Q of the large-diameter pinion gear 205 is drawn at a position where the radial distance from the rotational center axis of the sun gear 201 becomes Y1. The raceway diameter of the large-diameter pinion gear 205 is about the same as the length H in the height direction. In FIG. 10, the structure of the planetary gear mechanism 200 is illustrated when the gear ratio is 12.5.

Figure 6:
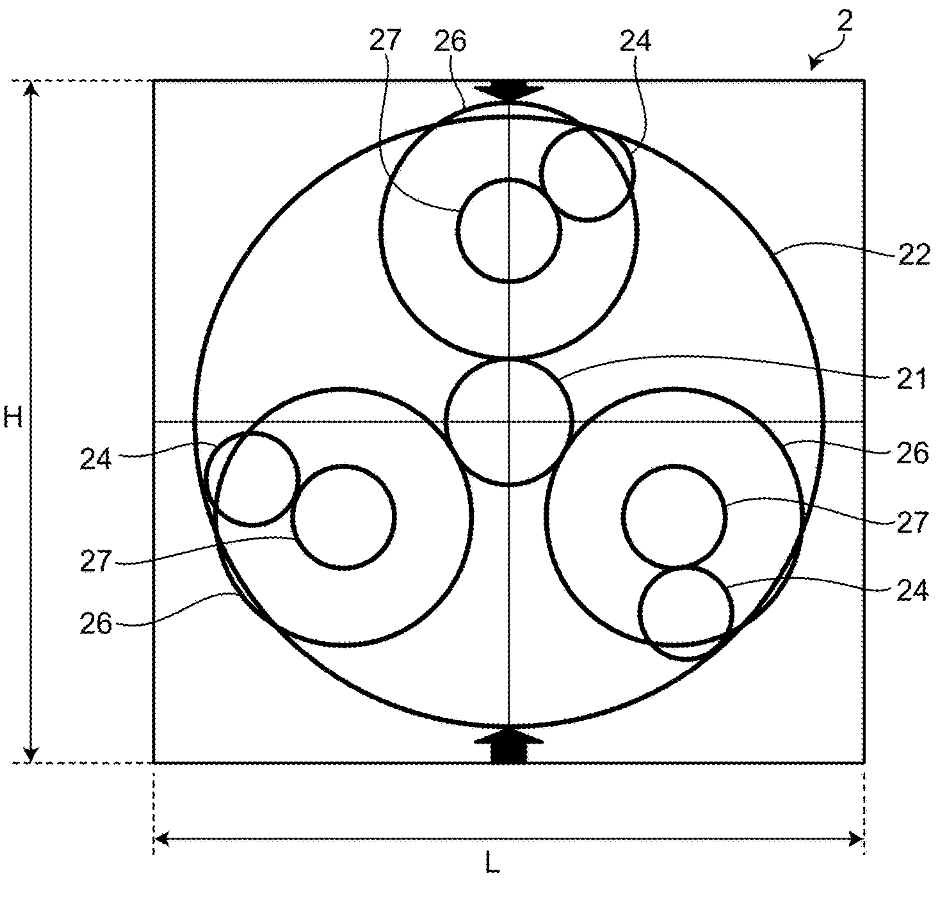
FIG. 6 is a diagram for explaining a body size of the planetary gear mechanism when a gear ratio is 12.5.

When the gear ratio is 12.5 in the transaxle 1, as illustrated in FIG. 6, the radial body size of the planetary gear mechanism 2 becomes smaller than that of the related-art structure. The radial body size can be divided into dimensions in the height direction and dimensions in the longitudinal direction. The dimension in the height direction of the planetary gear mechanism 2 becomes smaller than the length H.

Figure 7:
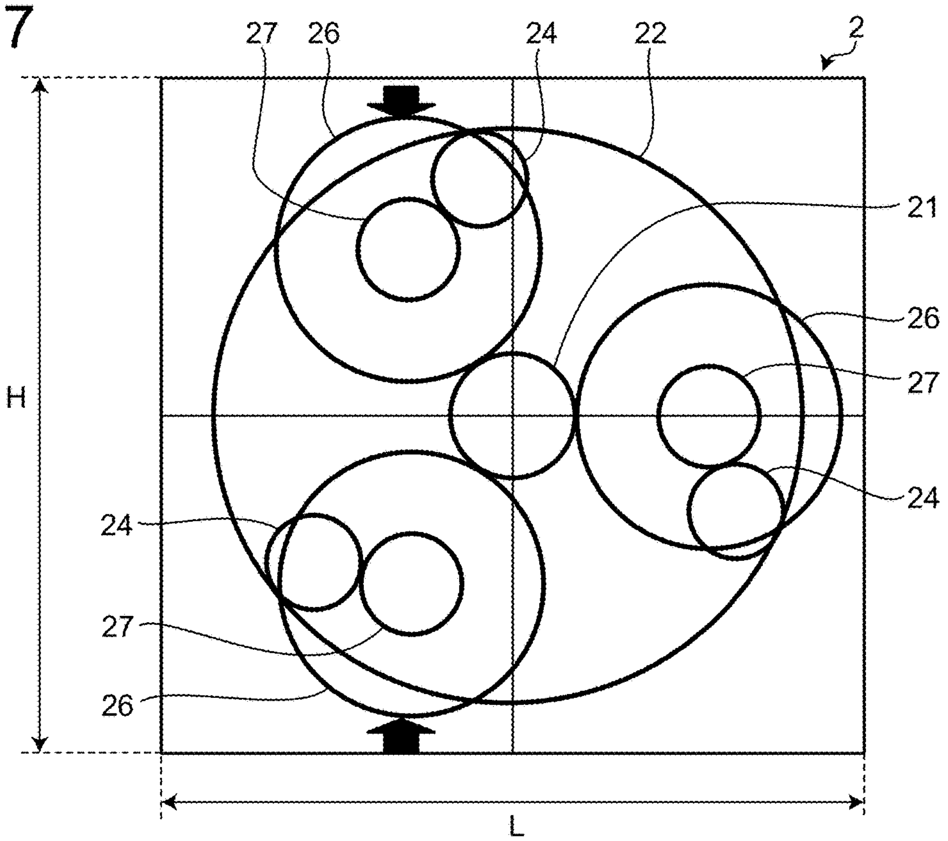
FIG. 7 is a diagram for explaining that it is possible to further reduce a radial body size of the planetary gear mechanism when the gear ratio is 12.5.

In the transaxle 1, since the carrier 25 becomes a fixing element, the large-diameter pinion gear 26 does not revolve although it rotates. As illustrated in FIG. 7, the height dimension can be reduced by shifting the phase of the large-diameter pinion gear 26 from the phase at 12 o'clock. The radial Dr of the ring gear 22 illustrated in FIG. 7 is the same as the radial Dr of the ring gear 22 illustrated in FIG. 6. Similarly, the dimension in the longitudinal direction can be reduced according to needs. In the transaxle 1, there is a degree of freedom of design by the phase arrangement of the large-diameter pinion gear 26. Incidentally, the height direction is the height direction of the vehicle mounted with the transaxle 1, the front-rear direction is the vehicle front-rear direction.

Figure 8:
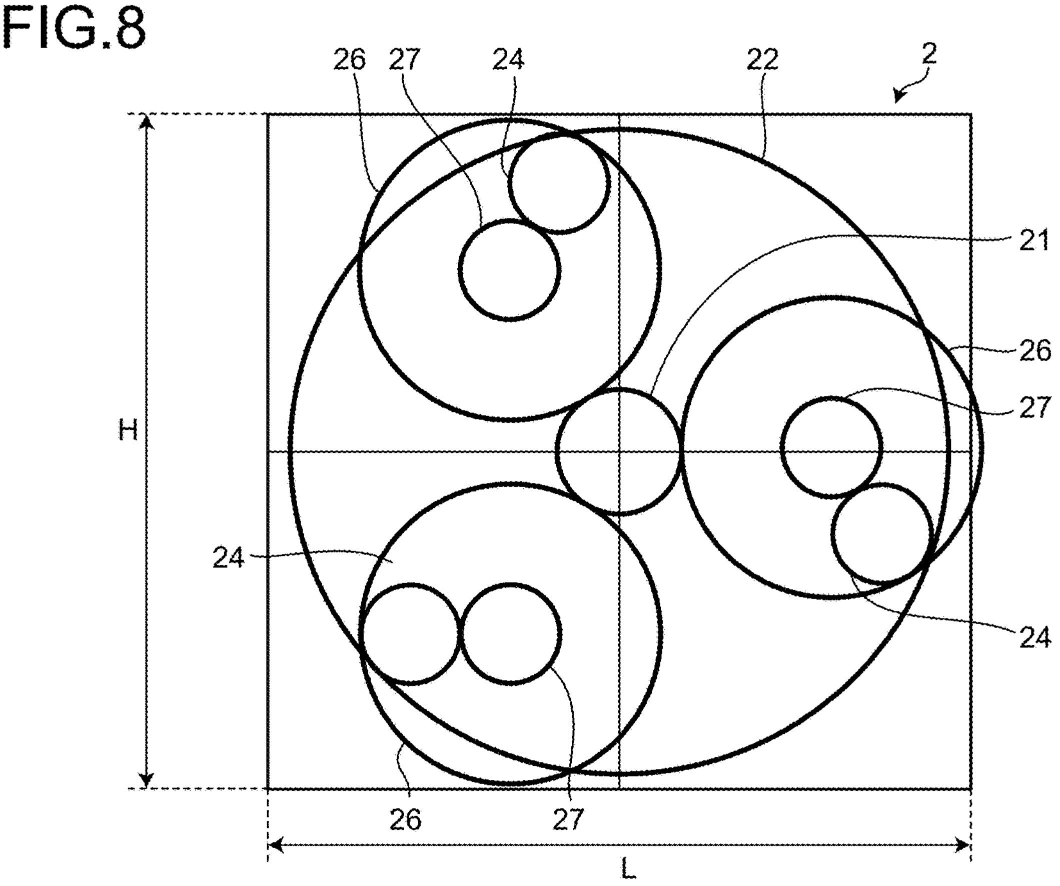
FIG. 8 is a diagram for explaining the body size of the planetary gear mechanism when the gear ratio is 15.7.

FIG. 8 illustrates a structure of the planetary gear mechanism 2 when the gear ratio is 15.7. As illustrated in FIG. 8, the transaxle 1 can take an even larger reduction ratio X instead of allowing the radial body size to increase. The radial Dr of the ring gear 22 illustrated in FIG. 8 is larger than the radial Dr of the ring gear 22 illustrated in FIGS. 7 and 6. The reduction of the axial dimension due to that the lamination thickness of the motor 5 is reduced becomes possible. Therefore, while reducing the axial body size of the transaxle 1, it is possible to secure even greater driving force. Incidentally, the axial direction is the same direction as the width direction of the vehicle.

Since the large-diameter pinion gear 26 does not revolve in the transaxle 1, it is possible to arrange another component in a space 49 of the phase in which the large-diameter pinion gear 26 is not disposed, as illustrated in FIG. 2. At a position where the planetary gear mechanism 2 is disposed of the gear chamber 11, the phase in which the large-diameter pinion gear 26 is not disposed, the space 49 that can place a different component from the planetary gear mechanism 2 is formed. For example, the space 49 may be provided with electric oil pumps, strainers, parking parts, actuators for moving them, and the like. Another component may be located in at least a portion of the space 49. Thus, it is possible to reduce the size of the entire transaxle 1. In the structure in which the ring gear that meshes with the large-diameter pinion gear 26 does not exist as in the planetary gear mechanism 2, the body size of another component, even when viewed somewhat from the space 49 illustrated in FIG. 2, is easy to utilize the space 49 because not directly connected to the component interference.

As described above, according to the embodiments, it is possible to reduce the size of the transaxle 1 while securing a larger reduction ratio X. According to the transaxle 1, it is possible to obtain a larger driving force while achieving both securing a large reduction ratio X and reducing the size of the motor 5.

The position of the outermost diameter portion of the large-diameter pinion gear 26 has been described structure radially outer than the ring gear 22 is not limited thereto. In the planetary gear mechanism 2, the outer diameter position of the ring gear 22 may be radially outward from the position of the outermost diameter portion of the large-diameter pinion gear 26. In short, either the position of the outermost diameter portion of the ring gear 22 and the position of the large-diameter pinion gear 26 may be positioned radially outward.

In the present disclosure, it is possible to secure a large driving force while suppressing an increase in size of the body, it is possible to take a large reduction ratio.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transaxle comprising:

a planetary gear mechanism having a stepped pinion gear in which a large-diameter pinion gear and a small-diameter pinion gear are integrated;

a differential device disposed radially inward of the small-diameter pinion gear; and a transaxle case for accommodating the planetary gear mechanism and the differential device, wherein the transaxle transmits a power of an electric motor to a vehicle axle through the planetary gear mechanism and the differential device, the planetary gear mechanism includes a sun gear, provided on an output shaft of the electric motor, which meshes with the large-diameter pinion gear, a ring gear which rotates at a same rotational speed as a differential case of the differential device rotates, a carrier, fixed to the transaxle case, which rotatably supports the stepped pinion gear, and an outer pinion gear which is rotatably supported by the carrier and meshes with the small diameter pinion gear and the ring gear.

2. The transaxle according to claim 1, wherein the transaxle case forms a motor chamber for accommodating the electric motor and a gear chamber for accommodating the planetary gear mechanism and the differential device, in a position where the planetary gear mechanism is disposed of the gear chamber, in a phase in which the large-diameter pinion gear is not disposed, a space is formed, where a component other than the planetary gear mechanism can be located, and the component is disposed in at least a portion of the space.

* * * * *